United States Patent
Jenkins

(10) Patent No.: US 11,143,319 B2
(45) Date of Patent: Oct. 12, 2021

(54) PRESSURE OPERATED SHUT OFF VALVE AND FLUID DISTRIBUTION SYSTEM COMPRISING SUCH PRESSURE OPERATED SHUT OFF VALVE

(71) Applicant: KAUTEX TEXTRON GMBH & CO. KG, Bonn (DE)

(72) Inventor: Martyn Jenkins, Gwent (GB)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 279 days.

(21) Appl. No.: 16/336,783

(22) PCT Filed: Sep. 7, 2017

(86) PCT No.: PCT/EP2017/072417
§ 371 (c)(1),
(2) Date: Mar. 26, 2019

(87) PCT Pub. No.: WO2018/054689
PCT Pub. Date: Mar. 29, 2018

(65) Prior Publication Data
US 2019/0277412 A1    Sep. 12, 2019

(30) Foreign Application Priority Data

Sep. 26, 2016  (DE) ..................... 10 2016 218 432.6

(51) Int. Cl.
*F16K 11/02* (2006.01)
*F16K 15/18* (2006.01)
(Continued)

(52) U.S. Cl.
CPC ............ *F16K 11/022* (2013.01); *B60S 1/481* (2013.01); *B60S 1/563* (2013.01); *B60S 1/58* (2013.01);
(Continued)

(58) Field of Classification Search
CPC .. B60S 1/481; B60S 1/563; B60S 1/58; B60S 1/60; B60S 1/603; F16K 11/161;
(Continued)

(56) References Cited

U.S. PATENT DOCUMENTS 2,476,320 A * 7/1949 Paulus .................. F16K 11/165
137/856
3,279,749 A * 10/1966 Fleckenstein ........... F16K 7/126
251/331

(Continued)

FOREIGN PATENT DOCUMENTS

CN    101737528    6/2010
CN    103261762    8/2013
(Continued)

OTHER PUBLICATIONS

Office Action from related Chinese Appln. No. 2017800727465, dated Nov. 12, 2019.
(Continued)

*Primary Examiner* — Hailey K. Do
(74) *Attorney, Agent, or Firm* — Grossman, Tucker, Perreault & Pfleger, PLLC

(57) ABSTRACT

A pressure operated shut off valve for a vehicle fluid distribution system, comprising at least one valve housing, a valve chamber enclosed by the valve housing, at least a first fluid entry port, at least a first fluid exit port, at least a first fluid inlet duct opening into the valve chamber, at least a first fluid outlet duct opening into the valve chamber, at least a first valve body slidably arranged in the valve chamber, the valve body being held closed against the valve seat and being operable by the fluid pressure provided in the inlet duct and acting on the valve body thus lifting the valve body from the valve seat, wherein a mechanical stop selectively blocking or unblocking the valve body upon actuating
(Continued)

is provided. A fluid delivery device utilizing such pressure operated shut off valve.

20 Claims, 6 Drawing Sheets

(51) Int. Cl.
*F16K 31/524* (2006.01)
*B60S 1/48* (2006.01)
*B60S 1/56* (2006.01)
*B60S 1/58* (2006.01)

(52) U.S. Cl.
CPC ...... *F16K 15/185* (2013.01); *F16K 31/52416* (2013.01); *F16K 31/52491* (2013.01)

(58) Field of Classification Search
CPC . F16K 7/16; F16K 7/17; F16K 15/144; F16K 15/185; F16K 31/52416; F16K 31/52483; F16K 31/52491; F16K 31/0641; F16K 31/0672
See application file for complete search history.

(56) References Cited

U.S. PATENT DOCUMENTS

| | | | |
|---|---|---|---|
| 3,738,389 A | 6/1973 | Cole et al. | |
| 4,006,753 A * | 2/1977 | Ingram, Jr. | F16K 31/52491 137/607 |
| 5,344,293 A | 9/1994 | Mota et al. | |
| 7,240,682 B2 | 7/2007 | Jenkins et al. | |
| 8,397,757 B2 | 3/2013 | Kannoo et al. | |
| 8,794,266 B1 * | 8/2014 | Friedman | F16K 11/04 137/862 |
| 9,261,086 B2 | 2/2016 | Takai et al. | |
| 2006/0220598 A1 * | 10/2006 | Argo | B60S 1/481 318/16 |
| 2009/0312674 A1 | 12/2009 | Nakao et al. | |

FOREIGN PATENT DOCUMENTS

| | | |
|---|---|---|
| GB | 1033145 | 6/1966 |
| JP | 47-5779 | 3/1972 |
| JP | S55-114641 | 9/1980 |
| JP | S56-53876 | 10/1982 |

OTHER PUBLICATIONS

Office Action from related Japanese Appln. No. 2019-516380, dated Sep. 17, 2019. English translation attached.
Office Action from related Chinese Appln. No. 201780072746.5, dated Sep. 24, 2020. English translation attached.
International Search Report, dated Dec. 21, 2017, received in corresponding PCT Application No. PCT/EP2017/072417.
International Preliminary Report on Patentability, dated Aug. 28, 2018, received in corresponding PCT Application No. PCT/EP2017/072417.
Office Action from related Japanese Appln. No. 2019-516380, dated Feb. 10, 2020. English translation attached.

* cited by examiner

PRESSURE OPERATED SHUT OFF VALVE AND FLUID DISTRIBUTION SYSTEM COMPRISING SUCH PRESSURE OPERATED SHUT OFF VALVE

FIELD

The invention refers to a pressure operated shut off valve for a vehicle fluid distribution system, comprising at least one valve housing, a valve chamber enclosed by the valve housing, at least a first fluid entry port, at least a first fluid exit port, at least a first fluid inlet duct opening into the valve chamber, at least a first fluid outlet duct opening into the valve chamber, at least a first valve body slidably arranged in the valve chamber, the valve body being held closed against a valve seat and being operable by the fluid pressure provided in the inlet duct and acting on the valve body, thus lifting the valve body from the valve seat upon pressurization.

The invention moreover refers to a fluid distribution device comprising a fluid pump, a first feedline, multiple fluid delivery lines to multiple fluid consumers and a pressure operated valve.

The invention also refers to a vehicle wash system with several consumers.

BACKGROUND

Modern screen wash systems for passenger cars normally include two or more cleaning fluid consumers as normally passenger cars do not only include windshield cleaning systems but also rear window cleaning systems and headlamp cleaning systems as well as cleaning systems for various cameras and various other sensors of the vehicle. The number of surfaces that require cleaning by a vehicle wash system during vehicle operation has increased in the past years and is continuing to increase. With the development of autonomous vehicles several more camera and sensor surfaces require cleaning.

Adding pumps and fluid reservoirs to the wash systems has disadvantages of adding weight, cost, complexity and requires significant space within the vehicle.

It is thus highly desirable to have only one cleaning fluid source and one cleaning fluid pump to provide cleaning fluid to several consumers selectively. A cleaning fluid source may be for example a cleaning fluid/washing fluid tank from which the cleaning fluid is supplied to the consumers via a cleaning fluid pump and a feedline system.

The general concept to deliver a cleaning fluid to several targets from one source with a single cleaning fluid pump is generally known in the art, for example from the patent publication U.S. Pat. No. 7,240,682. The system disclosed in this reference includes a washing fluid pump for windows and/or for head lamp cleaning installations, the pump housing having at least two selectively operable outlets and an impeller of the pump being axially displaceable. A first and second outlet of the pump may be pressurized selectively by reversing the rotational sense of the electric motor of the pump. However, this concept is only applicable for a limited amount of consumers/targets.

If fluid has to be supplied to more than two consumers/targets, switchable valves would be required to selectively provide cleaning fluid to a certain consumer. As the amount of valves required would correspond to the amount of consumers and each valve would require means for switching/actuation which could for instance be achieved by electromechanical actuators, a multi outlet distribution device for distribution of cleaning fluid to multiple consumers would be relatively complex and costly.

Generally, it would be desirable to utilize a system comprising pressure operated valves as these valves do not require electromechanical or electromagnetic actuation. A drawback of such pressure operated shut off valves is however that they do not allow precise individual control of each consumer without wasting cleaning fluid.

SUMMARY

It is thus an object of the current invention to provide a pressure operated shut off valve which is easy to control. It is furthermore an object of the current invention to provide a fluid distribution device comprising at least one pressure operated shut off valve which allows individual control of each consumer and which allows selectively supplying cleaning fluid to each consumer with only little or no wasted cleaning fluid.

The terms "target", "consumer" and "appliance" are hereinafter referred to synonymously. Such consumer in the sense of the current patent application is considered to be either a wash nozzle or a hydraulic or even pneumatic drive for a pressure activated cleaning system for a sensor, camera lens or screen or any other surface of the vehicle which needs to be cleaned.

This covers also devices which do not only utilize the cleaning fluid for the cleaning action itself, but also for driving moveable parts of a vehicle wash system.

According to one aspect of the current invention there is provided a pressure operated shut off valve for a vehicle fluid distribution system comprising at least one valve housing, a valve chamber enclosed by the valve housing, at least a first fluid entry port, at least a first fluid exit port, at least a first fluid inlet duct opening into the valve chamber, at least a first fluid outlet duct opening into the valve chamber, at least a first valve body slidably arranged in the valve chamber, the valve body being held closed against a valve seat and being operable by the fluid pressure provided in the inlet duct and acting on the valve body thus lifting the valve body from the valve seat, wherein a mechanical stop selectively blocking or unblocking the valve body upon actuation is provided.

Due to the mechanical stop feature selectively blocking or unblocking the valve body, the valve may be prevented from opening even when fluid pressure is applied and no fluid is discharged from the outlet. With this design it is easily possible to provide a pressure operated shut off valve with easy and precise mechanical control of the first fluid exit port.

If the mechanical stop is temporarily removed from the valve, fluid will exit through the first fluid outlet duct of the valve when the pump is operated and fluid pressure is applied. The mechanical stop can selectively unblock the valve body to allow the fluid exit port to deliver fluid as required.

The pressure operated shut off valve according to the invention may comprise a valve body which is a resilient diaphragm. The diaphragm may or may not be spring-biased against the valve seat, i.e., towards a closed position.

The design of the pressure operated shut off valve according to the current invention is particularly advantageous if the shut off valve comprises at least a second valve body, at least a second fluid outlet duct and at least a second fluid exit port and a selector mechanism comprising the mechanical stop and being configured such that it upon actuation selectively blocks or unblocks the first or the second valve body.

With the selector mechanism comprising the mechanical stop it is easily feasible to control multiple valve bodies and consequently easily possible to selectively provide a fluid to one or several fluid exit ports.

The selector mechanism may for example comprise a control cam serving as a mechanical stop. The control cam may comprise cam surfaces in the form of protrusions and/or indentations and/or cam recesses which may be positioned relative to a valve body so that depending on the position of the selector mechanism a first or second or a further valve body is selectively blocked or unblocked.

The selector mechanism may be arranged in or at the valve housing rotably or slidably and thereby selectively blocking and unblocking the valve body depending on the position of the selector mechanism. The selector mechanism may be for example in the form of a selector slide or a selector shaft.

Yet another aspect of the invention refers to a fluid distribution device comprising a fluid pump, a first feedline, multiple fluid delivery lines to multiple fluid consumers and at least a pressure operated valve with multiple valve bodies and multiple fluid exit ports, the feedline and the fluid delivery lines being connected by the pressure operated shut off valve. Preferably, the pressure operated shut off valve of the fluid distribution device comprises at least first and second valve bodies, at least a second fluid outlet conduct and at least a second fluid exit port and a selector mechanism comprising a mechanical stop and being configured such that it upon actuation selectively blocks or unblocks the first and/or the second valve body.

This design is most advantageous since it allows easy control of multiple valves or multiple valve bodies in one common valve housing with only one selector mechanism which indeed requires only one control and preferably at least only one drive. The valve bodies can be kept very simple, for example, as a resilient diaphragm which is spring-biased towards its valve seat or which is even biased towards its valve seat by the tensile forces of the resilient material.

The valve bodies may also be in the form of rigid pistons or flaps rather than in the form of resilient diaphragms.

Preferably, the fluid delivery lines are all connected in parallel to the first feedline.

In a particularly advantageous embodiment the fluid distribution device according to the current invention comprises first and second valve blocks, each valve block comprising multiple valve bodies and multiple fluid exit ports, the valve block being connected in parallel to one single fluid pump by first and second feedlines.

A valve block in the sense of the current invention is a valve housing which encloses multiple valve chambers and multiple valve bodies.

With the above referred embodiment of the fluid distribution device, it is most advantageous if the fluid pump is a rotationally reversible dual outlet fuel pump, so that the pump may, depending on its rotational sense, supply fluid either to the first or to the second valve block.

In a preferred variant of the fluid distribution device according to the current invention, the first and second valve blocks are arranged in a common fluid distribution housing, the selector mechanism is arranged between the valve blocks slidably within the fluid distribution housing such that it selectively blocks and unblocks the valve bodies of the first and second valve blocks in parallel.

Particularly, the fluid distribution device comprising a rotationally reversible dual outlet pump doubles the number of exit ports available and thus doubles the number of fluid outlets available. Controlling all the available exit ports or all the available valve bodies with only one selector mechanism is most effective in terms of easy control and in terms of cost.

Preferably, there is provided an electric drive driving the selector mechanism for selectively opening and closing the fluid exit ports of the pressure operated valve.

The electric drive may be at least one of a solenoid drive or a stepper motor.

Yet another aspect of the current invention refers to a vehicle wash system comprising at least two consumers chosen from a group of appliances comprising a head lamp wash device, a rear screen wash device, a front screen wash device, a front view camera wash device, a rear view camera wash device, a side view camera wash device, a surround view camera wash device and a sensor cleaning wash device, the vehicle wash system furthermore comprising a fluid distribution device of the above referred kind.

BRIEF DESCRIPTION OF THE DRAWINGS

Advantageous embodiments of the invention will be described hereinafter by way of example with reference to the accompanying drawings in which.

DETAILED DESCRIPTION

Figure 1:
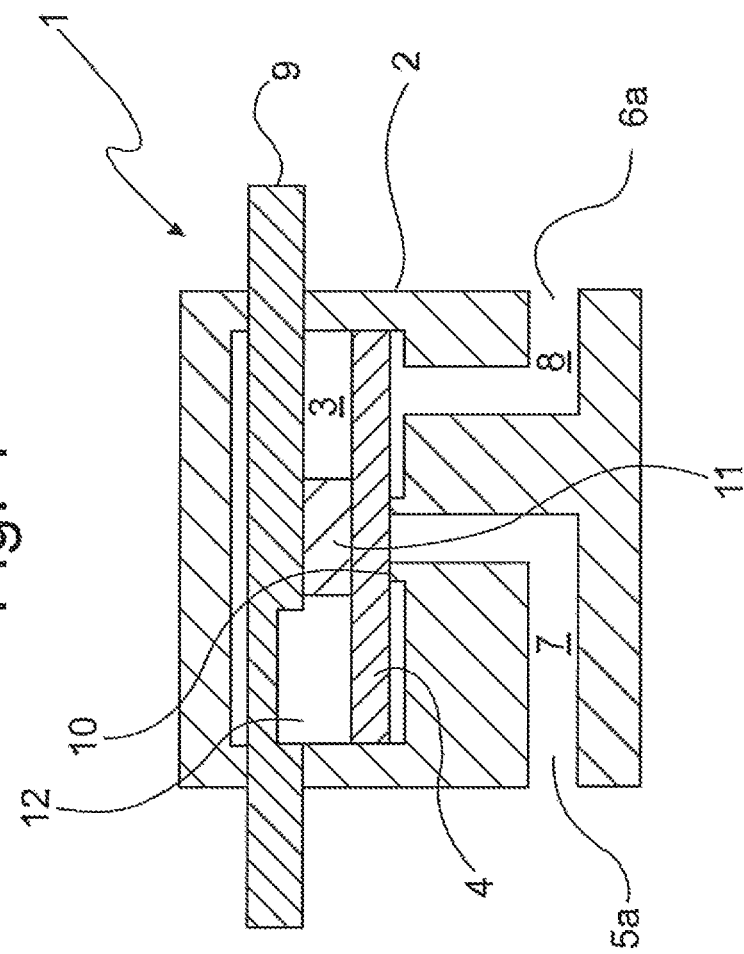
FIG. 1 shows a schematic and rather simplified view of an embodiment of a pressure operated shut off valve according to the invention.

Referring now to FIG. 1, FIG. 1 shows a pressure operated shut off valve 1 according to the current invention for the vehicle fluid distribution system explained hereinafter.

The pressure operated shut off valve 1 comprises a valve housing 2 enclosing a valve chamber 3 in which a valve body in the form of a resilient and flexible diaphragm 4 is arranged.

The valve housing 2 comprises a first fluid entry port 5a and a first fluid exit port 6a. The first fluid entry port 5a belongs to a fluid inlet duct 7 merging into the valve chamber 3, whereas the first fluid exit port 6a belongs to a first fluid outlet duct 8 opening into the valve chamber 3.

Within the valve chamber 2 there is arranged a selector slide 9 which is slidable from the left to the right and vice versa. The selector slide 9 may be driven by an electric motor which is not shown in FIG. 1. The selector slide 9 provides a mechanical stop for the diaphragm 4.

FIG. 1 shows the blocked position of the diaphragm 4 which abuts against a valve seat 10 at the periphery of an opening of the first fluid inlet duct 7 into the valve chamber 6. The diaphragm 4 has a cam follower 11 on the side facing towards the inside of the valve chamber 3. The cam follower 11 in FIG. 1 abuts the selector slide 9 which functions as a mechanical stop 4. The diaphragm in this position is held against the valve seat 10. The cam follower 11 can be an integral part of the diaphragm 4, however, alternatively, the cam follower 11 can be a separate part.

The selector slide 9 has a cam recess 12 of the side facing towards the diaphragm 4 and the cam follower 11 snugly fits into the cam recess 12 once the selector slide 9 is positioned such that the cam follower 11 of the diaphragm 4 and the cam recess 12 are aligned. In this position, fluid entering the first fluid entry port 5 will act on the diaphragm 4 and the hydraulic pressure of the fluid will lift the diaphragm 4 from the valve seat 10 thus establishing fluid communication between the first fluid inlet duct 7 and the first fluid outlet duct 8 via the valve chamber 3.

In the drawings, the design of the selector slide 9 is rather simplified, for example the cam recess 12 is shown to be rectangular in cross section, however, a person skilled in the art will appreciate that the side of the selector slide 9 facing towards the diaphragm 4 may have any shape and in particular may be designed as a cam surface with smooth transitions and with control curves.

A person skilled in the art will also appreciate that rather than a selector slide 9 there may be provided a rotable shaft or a disc with cam surfaces as a mechanical stop for the diaphragm 4.

Once the selector slide 9 is for example moved in FIG. 1 from the left to the right, the cam follower 11 is allowed to be moved into the cam recess 12, into which it fits and thus allowing the diaphragm 4 to be lifted off the valve seat 10 upon pressurization of the first fluid entry port 5a.

Figure 2:
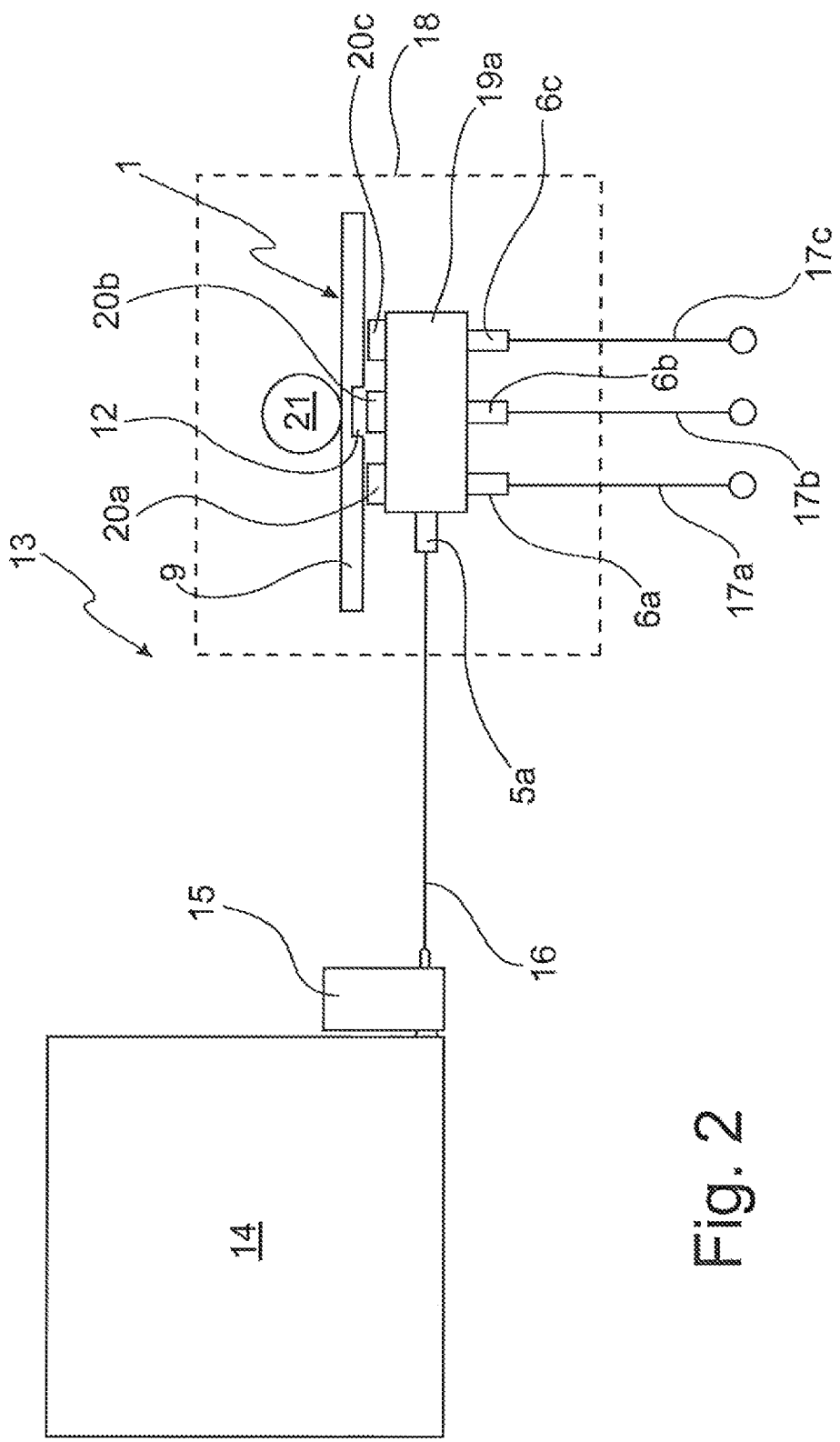
FIG. 2 is a schematic view of a first embodiment of the fluid distribution device according to the current invention.
Figure 3:
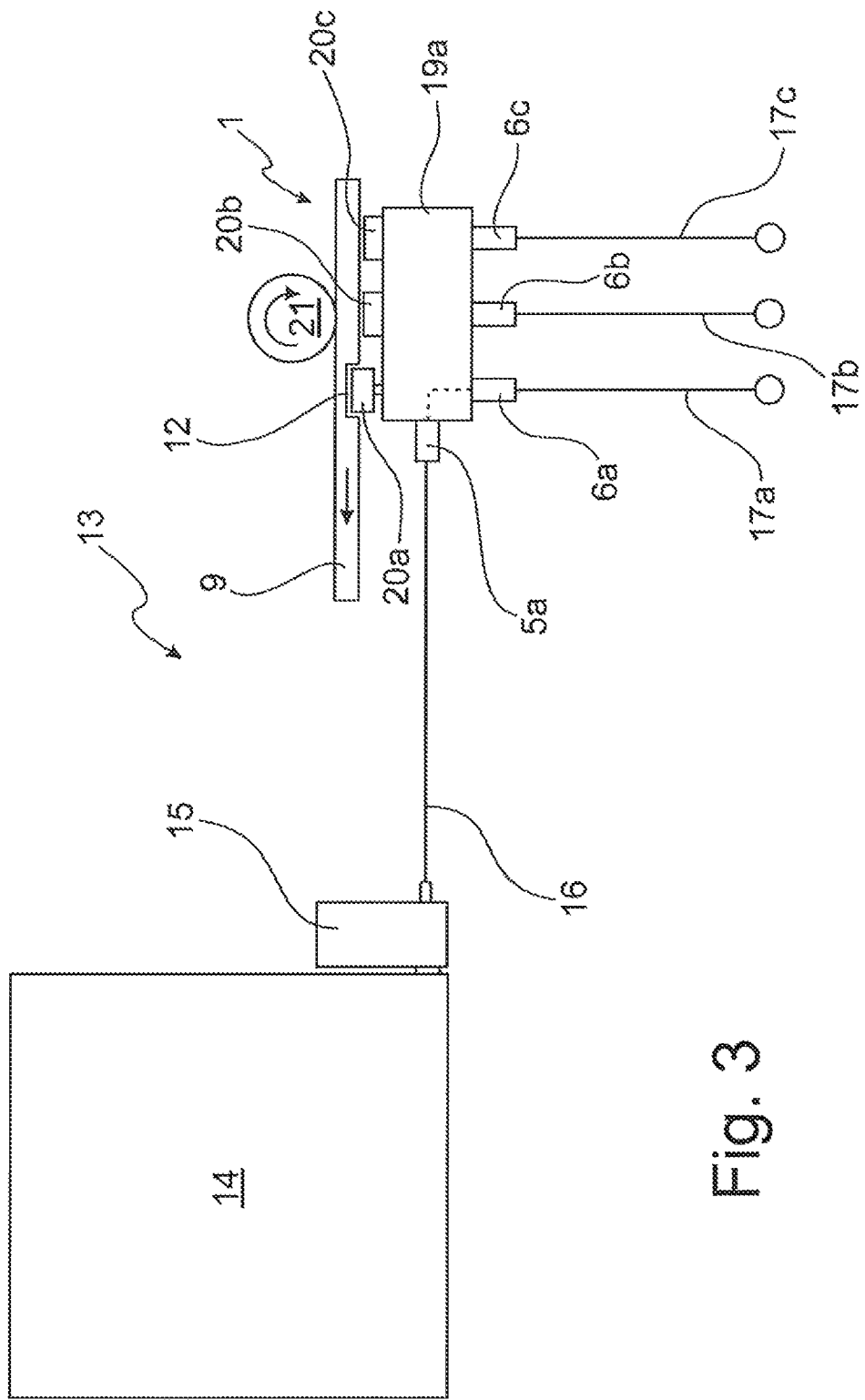
FIG. 3 is a schematic view of the embodiment according to FIG. 2 with arrows indicating the operation of the selector mechanism.
Figure 4:
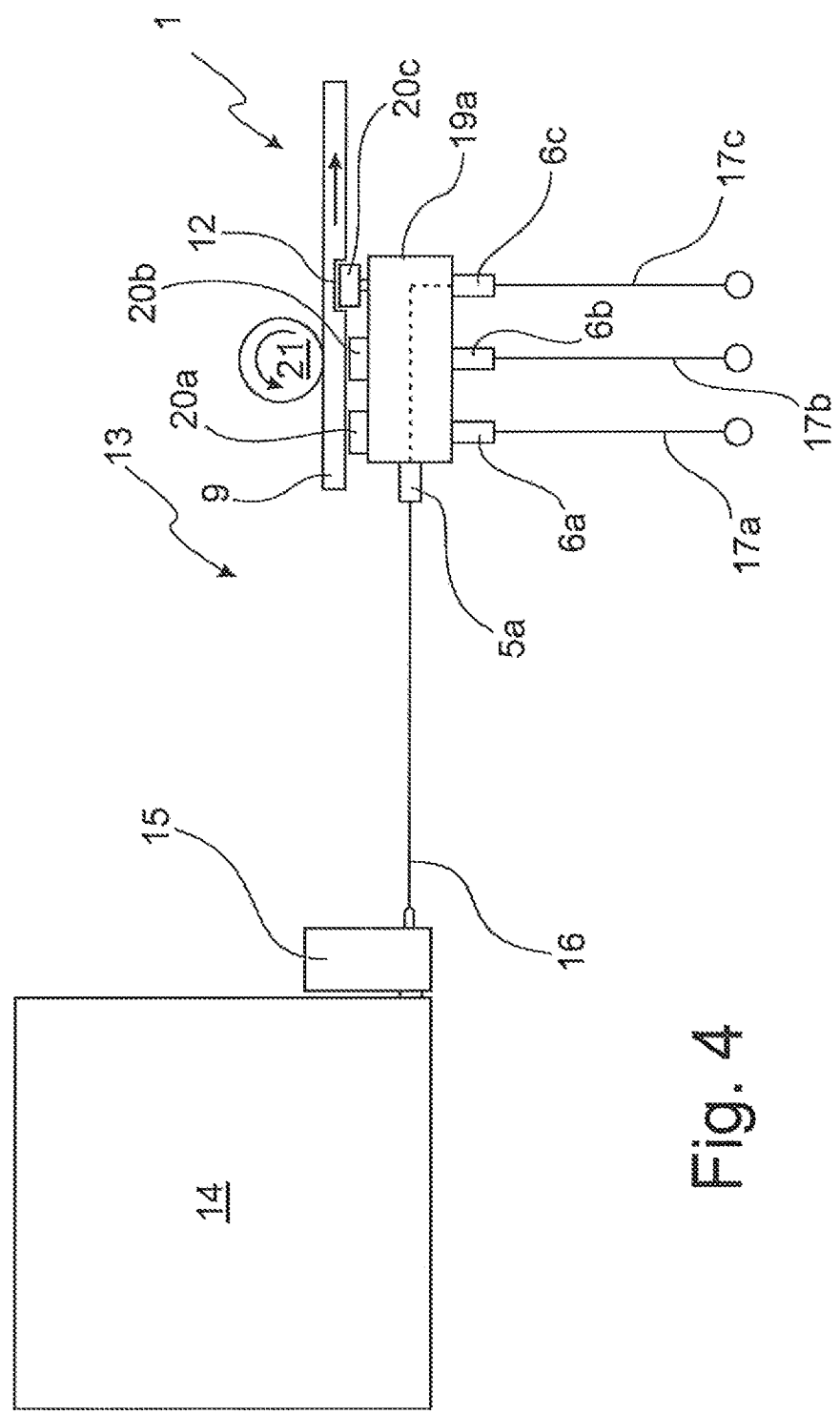
FIG. 4 is a schematic view according to that of FIG. 3 showing another mode of operation of the selector mechanism.

A first embodiment of the fluid distribution device 13 will hereinafter be explained with reference to FIGS. 2 to 4. In FIGS. 2 to 4 same parts will be denoted by the same reference numbers.

The fluid distribution device 13 according to FIG. 2 comprises a fluid source in the form of a fluid tank 14, a fluid delivery pump 15, a first feedline 16a and first, second and third fluid delivery lines 17a, 17b and 17c to multiple fluid consumers, for example two multiple spray nozzles of a vehicle screen wash system.

The fluid distribution device 13 includes a fluid distribution housing 18 in which a pressure operated shut off valve 1 of the kind as explained before is arranged. The pressure operated shut off valve 1 according to this embodiment has a first fluid entry port 5a and first, second and third fluid exit ports 6a, 6b and 6c. The valve housing 2 of the pressure operated shut off valve 1 is in the form of a first valve block 19a, comprising first, second and third valve bodies, the valve bodies being connected to first, second and third cam followers 20a, 20b, 20c, which correspond to the cam follower 11 as shown in FIG. 1.

At the valve housing 2, there is arranged a selector slide 9 with only one cam recess 12. The selector slide 9 is driven by an electric motor 21, which either can move the selector slides to the left as indicated in FIG. 3 or to the right as indicated in FIG. 4.

When the fluid delivery pump 15 is operated, fluid is delivered via first feedline 16a to the first fluid entry port and hydraulic pressure is applied to the first, second and third valve bodies.

Referring to FIG. 2, with the position of the selector plate 9 as shown, the first cam follower 20b is allowed to enter into cam recess 12 and consequently, the second valve body is permitted to be lifted up by the fluid pressure whilst all other valve bodies remain in their valve seat and are prevented from opening. In this condition, fluid is delivered via the second fluid exit port 6b to second fluid delivery line 17b and to a consumer, for example a spray nozzle of a vehicle screen wash system.

As shown in FIG. 3 and as indicated by the arrows, when the electrical motor 21 is operated in clockwise direction, selector plate 9 moves to a position which allows cam follower 20a to be lifted up so that the first valve body may open and establish a fluid connection between the first feedline 16a and the first fluid delivery line 17a.

As this is shown in FIG. 4, when electric motor 21 is operated in counter clockwise direction, selector plate 9 moves to a position which allows the third cam follower 20c to move into the cam recess 12 and thus a fluid connection between the first feedline 16a and the third fluid delivery line 17c will be established.

Figure 5:
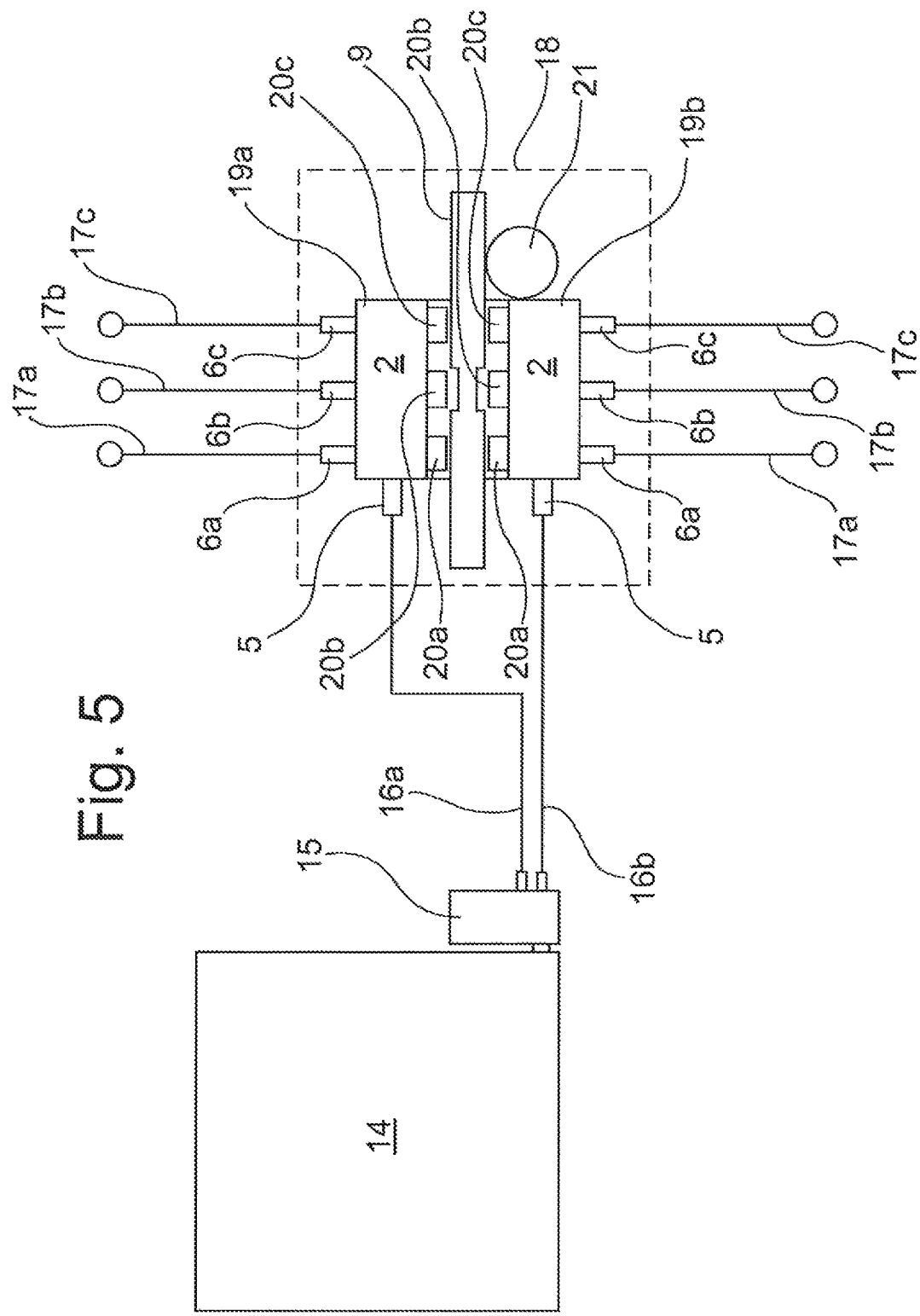
FIG. 5 is yet another embodiment of the fluid distribution device according to the current invention comprising first and second valve blocks controlled by one common selector mechanism.

Another embodiment of the fluid distribution device according to the current invention is shown in FIG. 5, in which same parts are denoted with same reference numerals.

The embodiment according to FIG. 5 differs from the embodiment according to FIGS. 2 to 4 in that the fluid delivery pump 15 is designed as a dual pump with reversible sense of rotation and with first and second feedlines 16a, 16b. The fluid delivery device 13 comprises a first valve block 19a and a second valve 19b, which are of about the same design. Each of the first and second valve blocks 19a and 19b includes first, second and third valve bodies arranged in first, second and third valve chambers. Each valve block 19a, 19b has its own valve housing 2.

A person skilled in the art will appreciate that several valve blocks may be arranged in one common valve housing.

The two valve housings are arranged in the fluid distribution housing 18. The first and the second valve blocks each have a first fluid entry port 5 and first, second and third fluid exit ports 6a, 6b, 6c connected to first, second and third fluid delivery lines 17a, 17b, 17c.

In the fluid distribution housing 18 there is arranged only one single selector slide 9 with a cam recess 12 on either side. Each of the first and second valve blocks 19a and 19b comprises first, second and third cam followers 20a, 20b, 20c, connected to the first, second and third valve bodies. The cam followers 20a, 20b, 20c of each of the first and the second valve blocks 19a and 19b are facing towards each other and the selector slide 9 is arranged between the first and second valve blocks 19a, 19b such that each of the second cam followers 20b of the fast valve block 19a and of the second valve block 19b may engage the cam recess 12 on either side of the selector slide 9 in the position shown in FIG. 5. First feedline 16a and first, second and third fluid delivery lines 17a, 17b and 17c are connected in parallel, whereas second feedline 16b and the first, second and third fluid delivery lines 17a, 17b, 17c of the second valve block 19b are also connected in parallel. When the fluid delivery pump 15 is operated with normal electrical polarity, fluid is delivered from the fluid delivery pump 15 via first feedline 16a to the first valve block 19a, when the fluid delivery pump 15 is operated with reversed electric polarity, fluid is delivered from the fluid delivery pump 15 via second feedline 16b to the second valve block 19b.

Now reference will be made to FIGS. 6 to 8 which show different embodiments of the fluid distributions device 13 with different drive mechanisms for the selector slide 9. For the sake of simplicity not all the parts of the fluid delivery device 13 are shown in the FIGS. 6 to 8. Again, same parts are denoted by same reference numerals.

Figure 6:
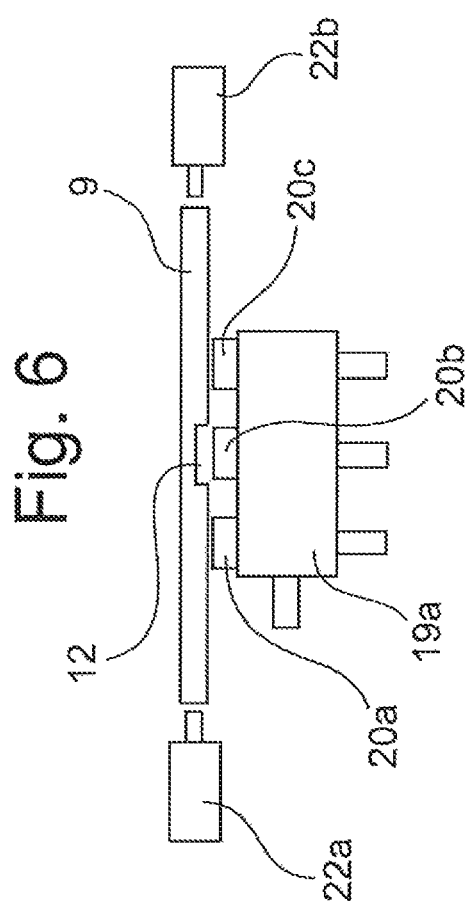
FIG. 6 is a schematic view of one embodiment of the fluid distribution device according to the invention, comprising two solenoid drives for driving the selector slide.

Turning now to FIG. 6, FIG. 6 shows the first valve block 19a of the fluid delivery device 13 and the selector slide 9 mounted at the first valve block 19a. The selector slide 9 has a drive mechanism comprising first and second solenoid actuators 22a and 22b. Energization of first solenoid actuator 22a pushes the selector slide 9 from the left to the right, energization of second solenoid actuator 22b pushes the selector slide 9 from the right to the left. As this can be seen from FIG. 6, there are three positions of the selector slide 9, the cam recess 12 of which can assume three different positions vis-à-vis first, second and third cam followers 20a, 20b and 20c.

Figure 7:
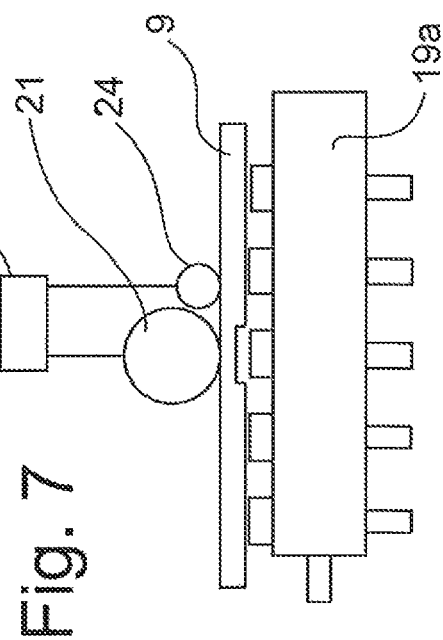
FIG. 7 is a fluid distribution device according to FIG. 6, comprising one single electric drive for driving the selector mechanism.

Turning now to FIG. 7, FIG. 7 shows yet another drive concept for the selector slide 9. The first valve block 19a has more than three fluid exit ports, so that the selector slide 9 has to assume more than three different positions. The selector slide 9 is driven by an electric motor 21 actuated by a motor control 23. The motor control 23 receives a control signal from a position encoder 24 which may for example detect a position marking on the selector slide 9.

Figure 8:
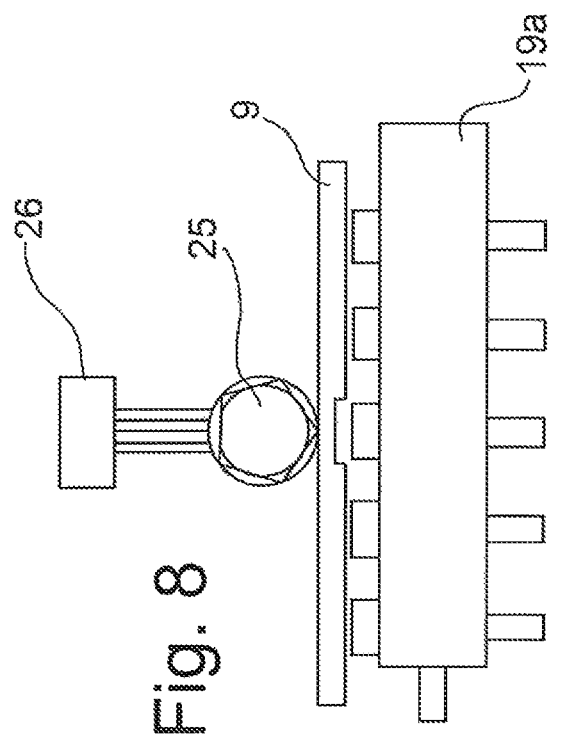
FIG. 8 is yet another drive concept for the selector mechanism of the fluid distribution device according to the invention.

Yet another concept of driving the selector slide is shown in FIG. 8. The selector slide 9 is driven by a stepper motor 25 which receives a control signal from a stepper motor control 26.

REFERENCE NUMERALS

1 Pressure operated shut off valve
2 Valve housing
3 Valve chamber
4 Diaphragm
5 First fluid entry port
6a,6b,6c First, second and third fluid exit ports
7 Fluid inlet duct
8 First fluid outlet duct
9 Selector slide
10 Valve seat
11 Cam follower
12 Cam follower recess
13 Fluid distribution device
14 Fluid tank
15 Fluid delivery pump
16a, 16b First and second feedlines
17a, 17b, 17c First, second and third fluid delivery lines
18 Fluid distribution housing
19a, 19b First and second valve blocks
20a, 20b, 20c First, second and third cam followers
21 Electric motor
22a, 22b First and second solenoid actuators
23 Motor control
24 Position encoder
25 Stepper motor
26 Stepper motor control

What is claimed is:

1. A pressure operated shut off valve for a vehicle fluid distribution system, the pressure operated shut off valve comprising:
 a valve housing;
 a valve chamber enclosed by the valve housing;
 a first fluid entry port;
 a first fluid exit port;
 a first fluid inlet duct opening into the valve chamber;
 a first fluid outlet duct opening into the valve chamber;
 a first valve body slidably arranged in the valve chamber, the first valve body being held closed against a valve seat and being operable by fluid pressure provided in the first fluid inlet duct and acting on the first valve body to lift the first valve body from the valve seat;
 a selector mechanism comprising a control cam serving as a mechanical stop;
 the mechanical stop selectively blocking or unblocking the first valve body upon actuation;
 wherein the selector mechanism is rotably or slidably arranged in the valve housing or at the valve housing and thereby selectively blocking and unblocking the first valve body depending on a position of the selector mechanism;
 wherein the first valve body is a resilient diaphragm;
 wherein the resilient diaphragm has a cam follower on a side facing towards an inside of the valve chamber;
 a second valve body;
 a second fluid exit port;
 a second fluid outlet duct; and
 the selector mechanism selectively blocking or unblocking the first valve body and/or the second valve body upon actuation.

2. The pressure operated shut off valve according to claim 1, wherein:
 the selector mechanism comprises a selector slide or a selector shaft.

3. A fluid distribution device including the pressure operated shut off valve of claim 1, and further comprising:
 a fluid delivery pump;
 a first feed line;
 a plurality of fluid consumers;
 a plurality of fluid delivery lines, wherein each one of the plurality of fluid delivery lines is arrangeable in fluid communication with at least one of the plurality of fluid consumers; and
 wherein the first feed line and the plurality of fluid delivery lines are connected by the pressure operated shut off valve.

4. The fluid distribution device according to claim 3, wherein:
 the plurality of fluid delivery lines are each connected in parallel to the first feed line.

5. The fluid distribution device according to claim 3, wherein:
 the fluid delivery pump is a rotationally reversible dual outlet pump.

6. A vehicle wash system including the fluid distribution device of claim 3, and further comprising at least one consumer, the at least one consumer comprising at least one of:
 a headlamp wash device;
 a rear screen wash device;
 a front screen wash device;
 a front view camera wash device;
 a night vision system;
 a license plate;
 a rearview camera wash device;
 a side view camera wash device;
 a surround view camera wash device; and
 a sensor cleaning device.

7. The fluid distribution device according to claim 3, further comprising:

the pressure operated shut off valve comprising a first valve block and a second valve block;

the first valve block and the second valve block each comprise a plurality of valve bodies and a plurality of fluid exit ports; and the first valve block and the second valve block being connected in parallel to the fluid delivery pump by the first feed line and a second feed line, respectively.

8. The fluid distribution device according to claim 7, wherein:

the first valve block and the second valve block are arranged in a common fluid distribution housing; and the selector mechanism is arranged between the first valve block and the second valve block slidably within the fluid distribution housing such that the selector mechanism selectively blocks and unblocks the plurality of valve bodies of the first valve block and the plurality of the valve bodies of the second valve block in parallel.

9. The fluid distribution device according to claim 3, further comprising:

an electric drive driving the selector mechanism.

10. The fluid distribution device according to claim 9, wherein:

the electric drive comprises at least one of a motor drive, a solenoid drive, a solenoid actuator or a stepper motor.

11. A fluid distribution device for a vehicle fluid distribution system, comprising:

a pressure operated shut off valve comprising
a valve housing;
a valve chamber enclosed by the valve housing;
a first fluid entry port;
a first fluid exit port;
a first fluid inlet duct opening into the valve chamber;
a first fluid outlet duct opening into the valve chamber;
a first valve body slidably arranged in the valve chamber, the first valve body being held closed against a valve seat and being operable by fluid pressure provided in the first fluid inlet duct and acting on the first valve body to lift the first valve body from the valve seat;
a selector mechanism comprising a control cam serving as a mechanical stop;
the mechanical stop selectively blocking or unblocking the first valve body upon actuation;
wherein the selector mechanism is rotably or slidably arranged in the valve housing or at the valve housing and thereby selectively blocking and unblocking the first valve body depending on a position of the selector mechanism;
wherein the first valve body is a resilient diaphragm;
wherein the resilient diaphragm has a cam follower on a side facing towards an inside of the valve chamber;
a fluid delivery pump;
a first feed line;
a plurality of fluid consumers;
a plurality of fluid delivery lines, wherein each one of the plurality of fluid delivery lines is arrangeable in fluid communication with at least one of the plurality of fluid consumers; and
wherein the first feed line and the plurality of fluid delivery lines are connected by the pressure operated shut off valve.

12. The fluid distribution device according to claim 11, wherein:

the pressure operated shut off valve further comprises
a second valve body;
a second fluid exit port;
a second fluid outlet duct; and
the selector mechanism selectively blocking or unblocking the first valve body and/or the second valve body upon actuation.

13. The fluid distribution device according to claim 11, wherein:

the selector mechanism comprises a selector slide or a selector shaft.

14. The fluid distribution device according to claim 11, wherein:

the plurality of fluid delivery lines are each connected in parallel to the first feed line.

15. The fluid distribution device according to claim 11, wherein:

the fluid delivery pump is a rotationally reversible dual outlet pump.

16. The fluid distribution device according to claim 11, further comprising:

the pressure operated shut off valve comprising a first valve block and a second valve block;

the first valve block and the second valve block each comprise a plurality of valve bodies and a plurality of fluid exit ports; and the first valve block and the second valve block being connected in parallel to the fluid delivery pump by the first feed line and a second feed line, respectively.

17. The fluid distribution device according to claim 16, wherein:

the first valve block and the second valve block are arranged in a common fluid distribution housing; and the selector mechanism is arranged between the first valve block and the second valve block slidably within the fluid distribution housing such that the selector mechanism selectively blocks and unblocks the plurality of valve bodies of the first valve block and the plurality of the valve bodies of the second valve block in parallel.

18. The fluid distribution device according to claim 11, further comprising:

an electric drive driving the selector mechanism.

19. The fluid distribution device according to claim 18, wherein:

the electric drive comprises at least one of a motor drive, a solenoid drive, a solenoid actuator or a stepper motor.

20. A vehicle wash system, comprising:

a fluid distribution device comprising
a pressure operated shut off valve comprising
a valve housing;
a valve chamber enclosed by the valve housing;
a first fluid entry port;
a first fluid exit port;
a first fluid inlet duct opening into the valve chamber;
a first fluid outlet duct opening into the valve chamber;
a first valve body slidably arranged in the valve chamber, the first valve body being held closed against a valve seat and being operable by fluid pressure provided in the first fluid inlet duct and acting on the first valve body to lift the first valve body from the valve seat;
a selector mechanism comprising a control cam serving as a mechanical stop;
the mechanical stop selectively blocking or unblocking the first valve body upon actuation;
wherein the selector mechanism is rotably or slidably arranged in the valve housing or at the valve housing and thereby selectively blocking and unblocking the first valve body depending on a position of the selector mechanism;
wherein the first valve body is a resilient diaphragm;
wherein the resilient diaphragm has a cam follower on a side facing towards an inside of the valve chamber;
a fluid delivery pump;
a first feed line;
a plurality of fluid consumers;
a plurality of fluid delivery lines, wherein each one of the plurality of fluid delivery lines is arrangeable in fluid communication with at least one of the plurality of fluid consumers; and
wherein the first feed line and the plurality of fluid delivery lines are connected by the pressure operated shut off valve; and at least one consumer, the at least one consumer comprising at least one of
a headlamp wash device;
a rear screen wash device;
a front screen wash device;
a front view camera wash device;
a night vision system;
a license plate;
a rearview camera wash device;
a side view camera wash device;
a surround view camera wash device; and
a sensor cleaning device.

* * * * *